(12) United States Patent
Mitchell et al.

(10) Patent No.: US 11,989,686 B2
(45) Date of Patent: May 21, 2024

(54) INVENTORY MANAGEMENT SYSTEM WITH RFID-TAGGED BINS ON SHELVES

(71) Applicant: DeRoyal Industries, Inc., Powell, TN (US)

(72) Inventors: Isaac B. Mitchell, Bristol, TN (US); Joe L. Smith, Powell, TN (US); Gregory S. Hodge, Knoxville, TN (US)

(73) Assignee: DeRoyal Industries, Inc., Powell, TN (US)

( * ) Notice: Subject to any disclaimer, the term of this patent is extended or adjusted under 35 U.S.C. 154(b) by 420 days.

(21) Appl. No.: 17/384,060

(22) Filed: Jul. 23, 2021

(65) Prior Publication Data

US 2022/0027841 A1    Jan. 27, 2022

Related U.S. Application Data (60) Provisional application No. 63/055,427, filed on Jul. 23, 2020.

(51) Int. Cl.
*G06Q 10/087* (2023.01)
*G06K 7/10* (2006.01)
(Continued)

(52) U.S. Cl.
CPC ....... *G06Q 10/087* (2013.01); *G06K 7/10099* (2013.01); *G06K 19/0723* (2013.01); *G06K 19/0776* (2013.01); *H01Q 1/2216* (2013.01)

(58) Field of Classification Search
CPC ............. G06Q 10/087; G06K 7/10099; G06K 19/0723; G06K 19/0776; G06K 7/10336;
(Continued)

(56) References Cited

U.S. PATENT DOCUMENTS

| | | | | |
|---|---|---|---|---|
| 7,504,949 B1 * | 3/2009 | Rouaix | ................. | G06Q 10/06 340/572.1 |
| 7,940,181 B2 * | 5/2011 | Ramachandra | ........ | G06Q 20/20 340/568.8 |

(Continued)

FOREIGN PATENT DOCUMENTS

| | | | |
|---|---|---|---|
| DE | 102011114612 A1 | 5/2013 | |
| EP | 2774875 A1 | 9/2014 | |

(Continued)

OTHER PUBLICATIONS

Ghelichi, Alireza, and Ahmed Abdelgawad. "A study on RFID-based Kanban system in inventory management." 2014 IEEE International Conference on Industrial Engineering and Engineering Management. (Year: 2014).*

(Continued)

*Primary Examiner* — Nathan A Mitchell
(74) *Attorney, Agent, or Firm* — Luedeka Neely, P.C.

(57) ABSTRACT

An apparatus for managing an inventory of goods stored in multiple bins on a shelving system includes an RFID antenna disposed on an upper shelf of the shelving system. The RFID antenna communicates with RFID tags disposed above the upper shelf RF shielding is disposed between the RFID antenna and lower shelves. An RFID tag is attached to a bin configured to contain the goods. The RFID tag is encoded with information identifying the goods stored in the bin. An RFID reader performs scans to detect RFID tags disposed above the upper shelf. An inventory computer generates a bin detection confirmation message based on the RFID tag being detected by the RFID reader at least a first number of times during a predetermined detection period. The inventory computer also generates a product reorder message based on the RFID tag being detected by the RFID reader at least a second number of times during the predetermined detection period, wherein the second number of (Continued)

times is greater than the first number of times. The product reorder message includes the information identifying the goods stored in the bin.

14 Claims, 4 Drawing Sheets (51) Int. Cl.
  *G06K 19/07* (2006.01)
  *G06K 19/077* (2006.01)
  *H01Q 1/22* (2006.01)
(58) Field of Classification Search
  CPC ........... G06K 7/10079; G06K 17/0029; G06K 19/07749; G06K 19/08; H01Q 1/2216
  See application file for complete search history.

(56) References Cited

U.S. PATENT DOCUMENTS

| | | | |
|---|---|---|---|
| 8,113,424 | B2 | 2/2012 | Philippe |
| 8,461,962 | B2 | 6/2013 | Philippe |
| 9,208,468 | B2 | 12/2015 | Olson et al. |
| 9,409,711 | B1* | 8/2016 | Hanssen ................ B65G 37/00 |
| 9,558,470 | B2 | 1/2017 | Matityaho |
| 9,773,092 | B2 | 9/2017 | Olson et al. |
| 10,380,543 | B2 | 8/2019 | Danilewitz |
| 10,402,600 | B1* | 9/2019 | Martin ............... G06K 7/10316 |
| 11,257,030 | B1* | 2/2022 | Kantor ................ G06Q 10/087 |
| 11,526,212 | B1* | 12/2022 | Yang ....................... G06F 1/163 |
| 2004/0046020 | A1 | 3/2004 | Andreasson et al. |
| 2010/0141457 | A1 | 6/2010 | Wass et al. |
| 2011/0001621 | A1* | 1/2011 | Iwahashi ................. G01S 13/04 340/572.1 |
| 2011/0084135 | A1* | 4/2011 | Philippe ................. G16H 40/20 235/375 |
| 2011/0139871 | A1* | 6/2011 | Yturralde ........... G06K 7/10336 235/492 |
| 2011/0254665 | A1 | 10/2011 | Lindsay et al. |
| 2014/0027510 | A1* | 1/2014 | Assouline .............. G16H 40/20 235/385 |
| 2014/0048593 | A1 | 2/2014 | Hoganson |
| 2016/0283898 | A1 | 9/2016 | Reuther et al. |
| 2016/0350706 | A1* | 12/2016 | Endries .................. G06Q 10/08 |
| 2017/0327312 | A1 | 11/2017 | Hoehler et al. |
| 2018/0005175 | A1* | 1/2018 | Philippe ................. B65F 1/1463 |
| 2018/0039758 | A1 | 2/2018 | MacDonald et al. |
| 2018/0060622 | A1* | 3/2018 | Pilzner ............. G06K 19/07705 |
| 2018/0121866 | A1* | 5/2018 | Higham ............... G06Q 10/087 |
| 2018/0235383 | A1 | 8/2018 | Josey |
| 2020/0143315 | A1* | 5/2020 | Marquette ............... H04W 4/80 |

FOREIGN PATENT DOCUMENTS

| | | |
|---|---|---|
| WO | 2016112461 A1 | 7/2016 |
| WO | 2017207708 A1 | 12/2017 |

OTHER PUBLICATIONS

Anna-Marie Vilamovska, Improving the quality and cost of health care delivery; The potential of radio frequency identification (RFID) technology; The Pardee RAND Graduate School ProQuest Dissertations Publishing, 2010 (Year: 2010).
International Searching Authority Authorized Officer Kari Rodriquez, PCT/US21/43010, PCT International Search Report and Written Opinion and Search History, dated Oct. 22, 2021, Alexandria, Virginia USA.

* cited by examiner

INVENTORY MANAGEMENT SYSTEM WITH RFID-TAGGED BINS ON SHELVES

RELATED APPLICATIONS

This application claims priority to U.S. provisional patent application Ser. No. 63/055,427, filed Jul. 23, 2020, titled "Inventory Management System with RFID-Tagged Shelving and Bins," the entire contents of which are incorporated herein by reference.

FIELD

This invention relates to the field of inventory management. More particularly, this invention relates to an RFID-enabled inventory reordering system.

BACKGROUND

Although RFID-enabled inventory management systems are available, such as DeRoyal's Continuum system, they generally require an RFID tag to be attached to each individual item to be tracked (or its packaging). Although these existing systems are good solutions for tracking high-cost or high-reimbursement-rate items, and for tracking supplies that require UDI registration for regulatory reasons and documentation efficiencies, they are not well suited for tracking low-cost items. Generally, end users do not want or need to track each individual low-cost item.

When replacing an existing inventory management solution, end users generally desire one inventory management solution that will handle all types of supplies, including low-cost supplies, high-cost supplies, UDI supplies, patient-chargeable supplies, and patient non-chargeable supplies. Because current RFID-enabled inventory management systems offer only tracking solutions for individually-tagged items, and end users typically choose to not RFID-tag low-cost high-use items, there is a gap in their inventory management strategy. It is desirable to have one system that can provide a complete RFID-based inventory management solution.

To accomplish this, Kanban methodology can fill the low-cost item gap. Kanban (pronounced "Kahn-Bahn") is a Japanese term for signal. It refers to methodologies that are used to manage inventory and reduce the chance of running out of supplies. It also creates FIFO (First In, First Out) for inventory to help prevent expired supplies. Today, traditional Kanban requires staff labor to conduct either a physical count or a visual order, or manually place a paper Kanban card into a reorder bin.

What is needed, therefore, is a system that can provide a complete, RFID-based inventory management solution for high-cost and low-cost items, and which employs the Kanban methodology for the low-cost items.

SUMMARY

The above and other needs are met by an apparatus for managing an inventory of goods stored in multiple bins on a shelving system. In one preferred embodiment, the apparatus includes an RFID antenna disposed in or on an upper shelf of the shelving system. The RFID antenna is configured to communicate with RFID tags disposed above the upper shelf. RF shielding is disposed between the RFID antenna and lower shelves disposed below the upper shelf. The apparatus also includes a first RFID tag attached to a bin configured to contain the goods. The first RFID tag is encoded with information identifying the goods stored in the bin. An RFID reader performs scans to detect RFID tags disposed above the upper shelf. The apparatus includes an inventory computer that executes instructions to generate a bin detection confirmation message based on the first RFID tag being detected by the RFID reader at least a first number of times during a predetermined detection period. The inventory computer also executes instructions to generate a product reorder message based on the first RFID tag being detected by the RFID reader at least a second number of times during the predetermined detection period, wherein the second number of times is greater than the first number of times. The product reorder message includes the information identifying the goods stored in the bin.

In some embodiments, the apparatus includes a user interface configured to display the bin detection confirmation message to a user.

In some embodiments, the apparatus includes an inventory management server computer in communication with the inventory computer via a communication network. The inventory management server computer is programmed to initiate a process to order an additional supply of the goods identified by the information in the product reorder message.

In some embodiments, the first RFID tag comprises two RFID integrated circuits oriented at a right angle with respect to each other.

In some embodiments, the apparatus includes a second RFID tag attached to the bin at a right angle with respect to the first RFID tag. The second RFID tag is also encoded with information identifying the goods stored in the bin.

In some embodiments, the first number of times is at least three times, the second number of times is at least 30 times, and the predetermined detection period is at least 300 seconds.

In some embodiments, the RFID antenna and the RF shielding are integrated into a panel configured to be disposed in or on the upper shelf of the shelving system.

In some embodiments, the first RFID tag is attached to a bottom surface of the bin using an adhesive strip, while in other embodiments, the first RFID tag is integrated into the bottom surface of the bin.

In another aspect, embodiments of the invention provide a method for managing an inventory of goods stored in multiple bins on a shelving system. A preferred embodiment of the method includes:

(a) disposing an RFID antenna in or on an upper shelf of the shelving system, the RFID antenna for communicating with RFID tags disposed above the upper shelf;

(b) disposing RF shielding between the RFID antenna and a lower shelf of the shelving system that is disposed below the upper shelf;

(c) attaching an RFID tag to a bin configured to contain the goods, the RFID tag encoded with information identifying the goods stored in the bin to which the first RFID tag is attached;

(d) stocking the bin with an initial quantity of the goods;

(e) disposing the bin on the lower shelf of the shelving system;

(f) depleting the initial quantity of the goods in the bin over time as the goods are consumed;

(g) upon depletion of the initial quantity of the goods in the bin, placing the bin above the RFID antenna on the upper shelf;

(h) performing scans to detect RFID tags disposed above the upper shelf using an RFID reader that is in electrical communication with the RFID antenna;

(i) detecting the RFID tag attached to the bin that was placed above the RFID antenna;

(j) generating a bin detection confirmation message based on the RFID tag attached to the bin being detected by the RFID reader at least a first number of times during a predetermined detection period, wherein the bin detection confirmation message is generated based on instructions executed by an inventory computer that is in electrical communication with the RFID reader;

(k) displaying the bin detection confirmation message on a user interface device that is in electrical communication with the inventory computer;

(l) generating a product reorder message based on the RFID tag attached to the bin being detected by the RFID reader at least a second number of times during the predetermined detection period, wherein the product reorder message is generated based on instructions executed by an inventory computer, wherein the product reorder message includes the information identifying the goods stored in the bin, and wherein the second number of times is greater than the first number of times;

(m) communicating the product reorder message to an inventory management server computer; and (n) the inventory management server computer initiating a process to order an additional supply of the goods identified by the information in the product reorder message.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

As the term is used herein, a "medical item" is an item, device, material, substance, or piece of durable medical equipment (DME) that may be used or consumed during the performance of a medical procedure or that is dispensed to a patient to treat a medical condition or provide comfort to the patient. For example, a surgical implant is a medical item. Knee braces, negative pressure wound therapy units, blood glucose monitors, and wheelchairs are further examples of medical items. Sponges, gloves and drapes are also medical items. This disclosure is concerned mainly with low-cost medical items that may be stored in bins that are kept on shelving units before they are used in treatment of a patient. Generally, the items in each bin are identical to all of the other items in the same bin.

Typical Kanban systems rely on clinical and materials personnel to physically move a card or bin to indicate the need for a supply reorder of medical items. This can result in reorder breakdowns due to staff noncompliance.

Embodiments described herein—referred to as Continuum Kanban or passive RFID Kanban—automate a traditional Kanban system. With Continuum Kanban, an RFID-enabled reorder panel is placed on the top shelf of an end user's existing storage shelving. Alternatively, the reorder panel may completely replace the top shelf of the end user's existing storage shelving. The location of the reorder panel can be changed based on the end user's needs. An antenna in the reorder panel reads the complete collection area. For example, front-to-back, side-to-side, end-to-end.

Figure 6:
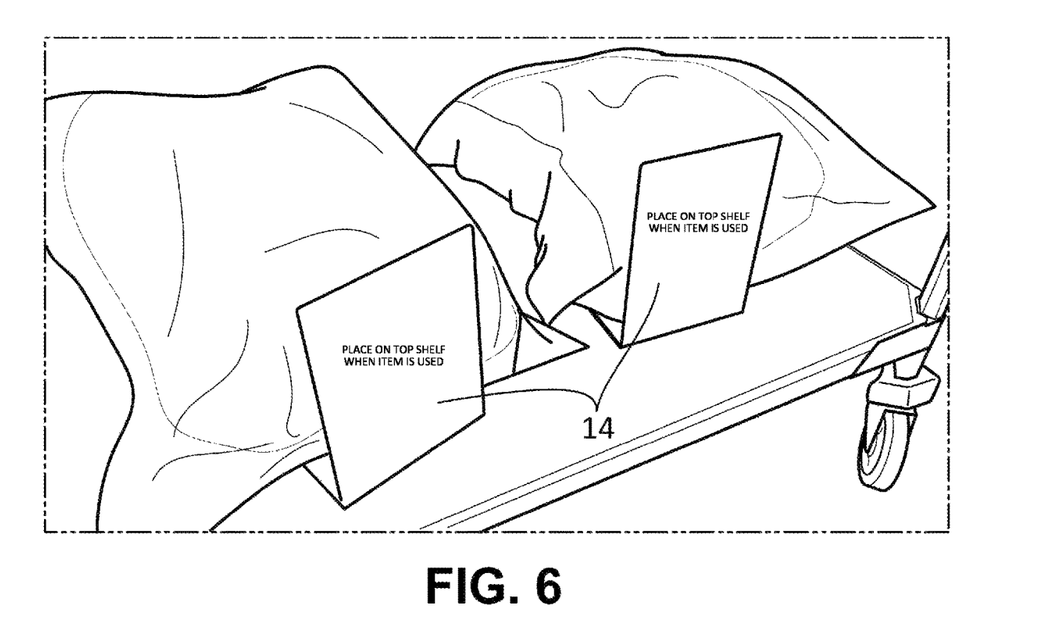
FIG. 6 depicts bookend style bins according to a preferred embodiment.

One or more RFID tags are attached to the end user's current plastic storage bins. Thus, the end user does not need to replace its existing bins. As the term is used herein, a "bin" refers to any kind of container—disposable and non-disposable—for holding medical items and other goods on storage shelving, including boxes, bins, canisters, jars, buckets, and racks. The term "bin" also refers to other types of storage devices, such as the bookend structures that may be used with bulky items, such as shown in FIG. 6. The RFID tags may be applied to the bottoms of the existing bins using an adhesive with a peel-away backing. The RFID tags are encoded with needed product information, including but not limited to the item number, quantity, room location, shelf location, bin number, and pick location.

In a preferred embodiment, two RFID tags are attached to each bin, with one rotated by 90 degrees with respect to the other. This provides an increased chance of detection of at least one of the tags, no matter the rotational orientation of the bin with respect to the reorder panel.

After items in the bins are used, the empty bins are placed on the reorder panel where the RFID tags on the bins are read. RFID-tagged bins can also be placed in another RFID-enabled collection area (i.e., a collection bin, box, top shelf, bottom shelf). Placement of the RFID-tagged bins on the reorder panel or other RFID-enabled collection area triggers an automated inventory order. When supplies arrive, they are stocked back into the corresponding RFID-tagged bin and placed in the correct inventory location.

Figure 1:
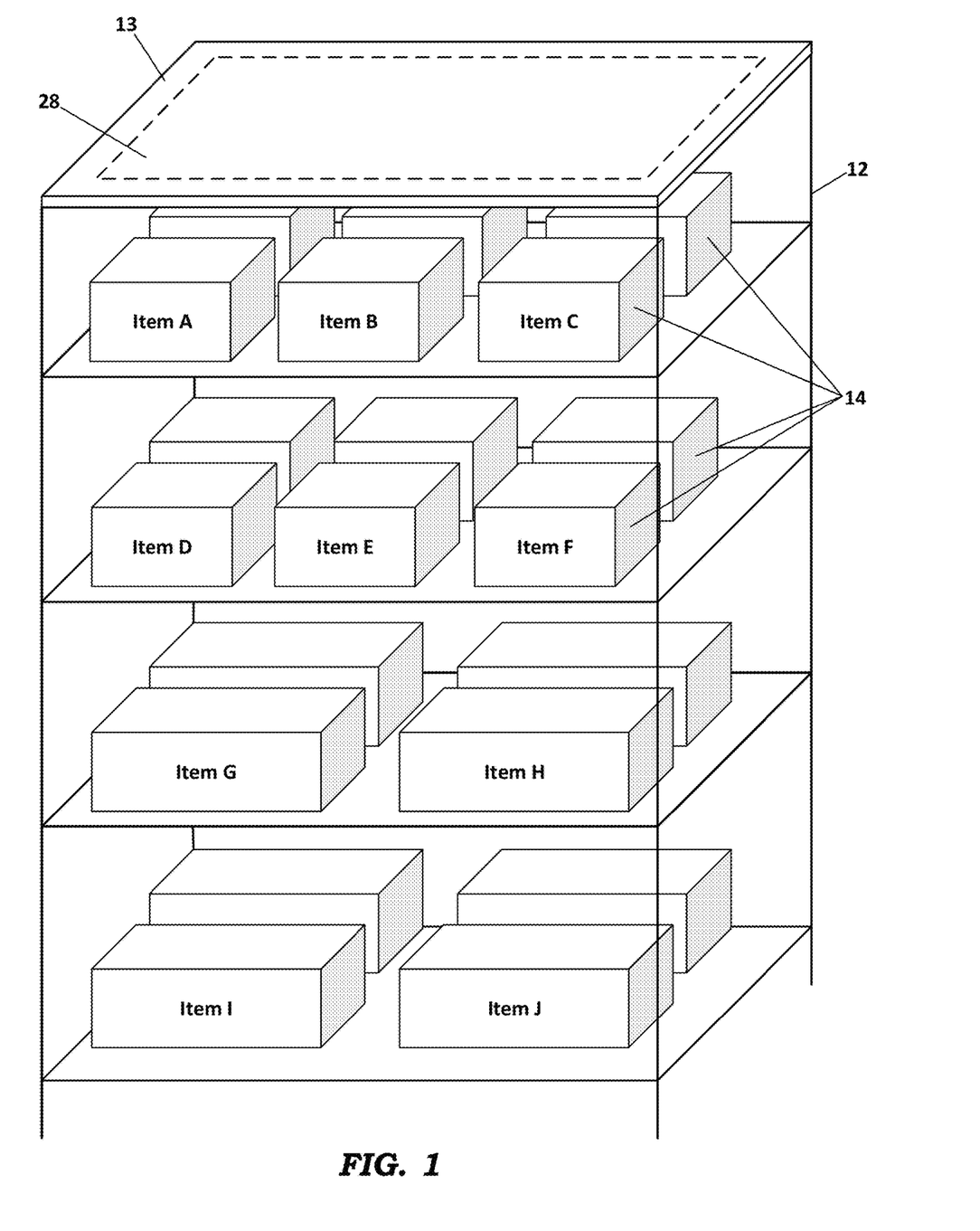
FIG. 1 depicts a medical item storage shelving unit according to a preferred embodiment.

FIG. 1 depicts an end user's wire shelving unit 12 having shelves that hold bins 14 containing various medical items. A reorder panel 13 is placed on the top shelf of the end user's shelving unit 12. In a preferred embodiment, the reorder panel 13 has an RFID antenna 28 integrated into it. Generally, when all of the items have been removed from a front bin 14, that empty bin is placed on top of the reorder panel 13, and the rear bin 14—which should be full at this point—is moved forward to the front position on the shelf.

Figure 2:
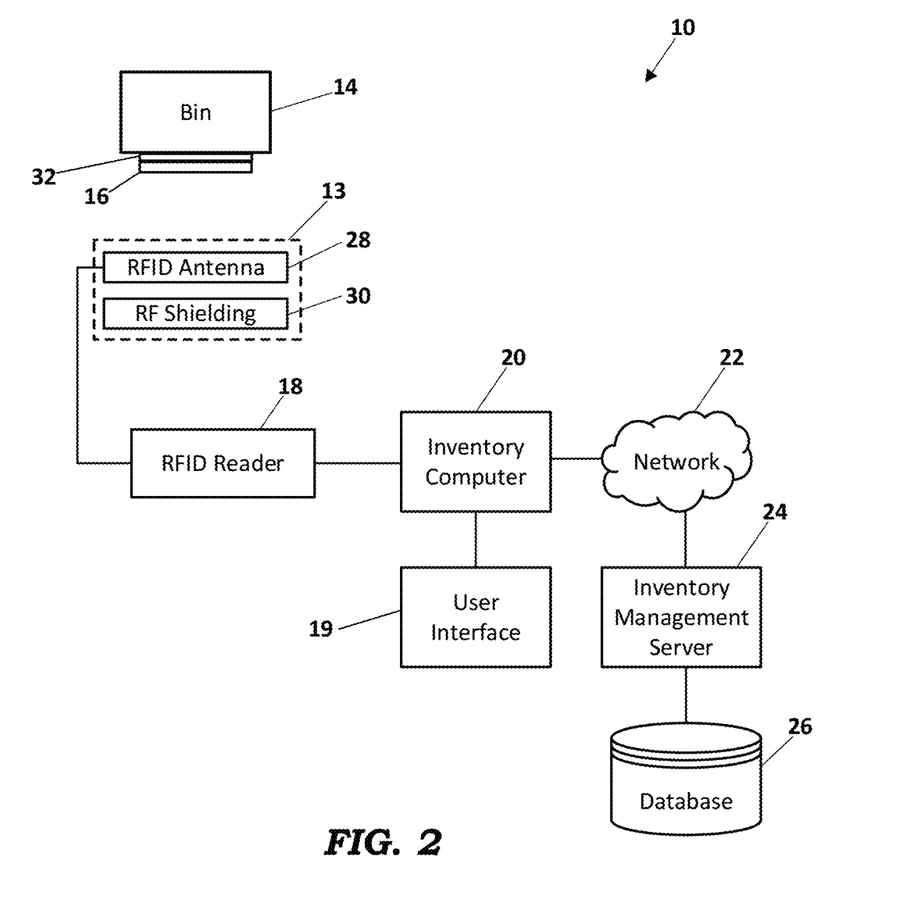
FIG. 2 depicts a system for automated management of a medical item inventory according to a preferred embodiment.
Figure 3:
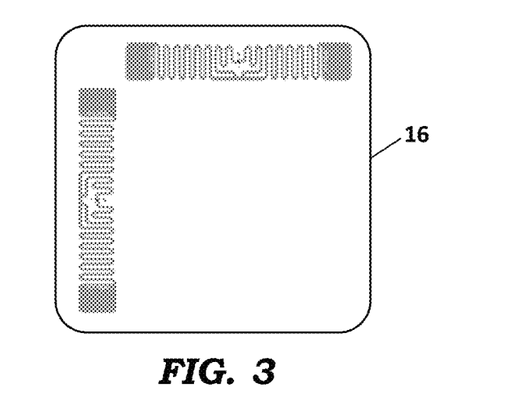
FIG. 3 depicts a plan view of an RFID tag according to a preferred embodiment.

FIG. 2 depicts an embodiment of a system 10 for automated management of a medical item inventory in a healthcare facility setting. The system 10 includes one or more RFID tags 16 attached to the bottom of a bin 14 by an adhesive layer 32. As shown in the preferred embodiment of FIG. 3, each RFID tag 16 preferably includes two RFID integrated circuits oriented at a right angle with respect to each other. The system 10 also includes the reorder panel 13 into which is integrated the RFID antenna 28. In one embodiment, the antenna 28 is a custom-designed nearfield/shortrange directional UHF antenna operating in the 902-928 MHz frequency range. The antenna 28 is electrically connected, such as via a coaxial cable, to a UHF RFID tag reader 18, such as an Impinj® Speedway Revolution® model R420.

In preferred embodiments, RF shielding 30 is also integrated into the reorder panel 13, below the antenna 28. As the term is used herein, "shielding" comprises a solid metal plate or a metal mesh that is designed to prevent the antenna 28 from receiving RFID signals from RFID tags on bins 14 located on the shelves below the reorder panel 13 at a signal-to-noise ratio high enough to trigger detection of those RFID tags. For purposes of this disclosure, the shielding 30 does not necessarily have to block absolutely all RF energy from reaching the antenna 28, as this may require unnecessary levels of shielding.

In alternative embodiments, the RFID antenna 28 and the shielding 30 may be provided as separate components that are not integrated into a panel.

In preferred embodiments, the reorder panel 13 is sized and configured to fit precisely within the area of the shelves of standard-size wire shelf units, such as 48×16 inch or 36×16 inch units. In this way, the end user needs only to place the reorder panel 13 onto the top shelf of their existing wire shelving unit 12, with no modifications needed.

The reader 18 periodically perform scans to detect RFID tags 16 attached to empty bins 14 that have been placed on the reorder panel 13. As the term is used herein, a "scan" for RFID tags refers to operations performed by the RFID reader 18 to transmit signals and receive signals from RFID tags that are in range of the RFID reader 18 and its associated antenna 28.

The RFID tag reader 18 is electrically connected via a local area network (LAN) to a medical item inventory computer 20, which may be a server computer, desktop computer, laptop computer, tablet computer or other mobile computing device. Alternatively, the electrical connection between the RFID tag reader 18 and the computer 20 is via a Universal Serial Bus (USB) interface or other serial interface. The computer 20 includes memory for storing and a processor for executing instructions for updating and maintaining inventory records as described in more detail herein. In some embodiments, a user interface device 19 is connected to the computer 20, which may be used to receive user identification credentials. The user interface device 19 may include one or more of a touch screen display, a keypad, a biometric sensor such as a fingerprint reader or retinal scanner, and a code reader, such as an RFID reader, barcode reader or magnetic stripe reader. Such interface components may be used to read or otherwise receive identification information of personnel seeking to access inventory data via the computer 20.

In a preferred embodiment, the inventory computer 20 is in communication with a wide area communication network 22, such as the Internet, through which the computer 20 communicates with an inventory management server 24 and a medical item inventory database 26. In an alternative embodiment, the computer 20 communicates with the server 24 and database 26 via a local area network. The inventory database 26, which may be maintained by an inventory service provider entity, stores information regarding medical items, including the item numbers, quantities, room locations, shelf locations, bin numbers, and pick locations. In a preferred embodiment, the server 24 executes software instructions for communicating with the inventory computer 20, and for processing inventory records stored in the database 26.

Figure 4:
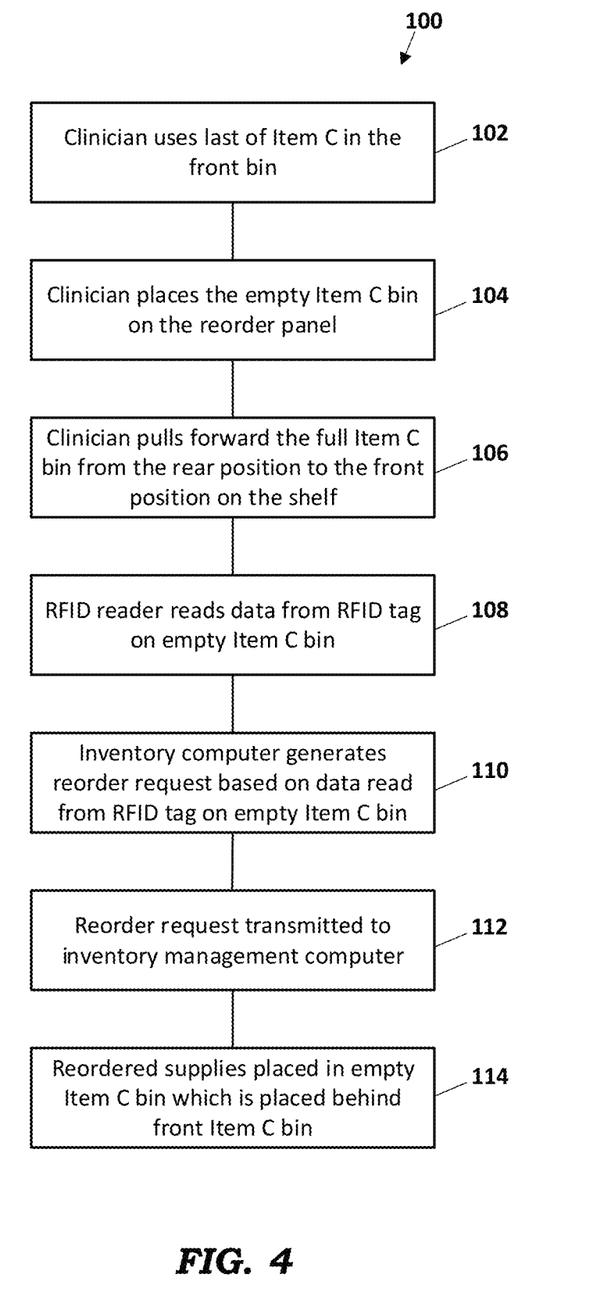
FIG. 4 depicts a method for implementing passive RFID Kanban according to a preferred embodiment.

FIG. 4 depicts a method 100 for implementing passive RFID Kanban according to a preferred embodiment. When a clinician or other medical personnel pulls the last item from one of the front bins 14 (step 102), the clinician places the empty bin 14 on the reorder panel 13 (step 104), and pulls forward the full bin 14 from the rear of the shelf to the front position on the shelf (step 106). The RFID reader 18 performs a scan, detects the RFID tag 16 on the empty bin 14, and reads the data from the tag (step 108). The data from the RFID tag 16 is transmitted to the inventory computer 20, which generates a reorder request for the items that were in the empty bin 14 (step 110), and the reorder request is transmitted to the inventory management computer (step 112). After the order is processed, the reordered supplies are placed in the empty bin 14, which is placed on the shelf behind the front bin 14.

In a preferred embodiment, an algorithm is implemented by the inventory computer 20 to confirm for the user that a bin 14 has been detected on the reorder panel 13. Although it is desirable to provide this confirmation for the user quickly, it is important for the confirmation to be accurate before product is reordered. Unfortunately, in passive RFID detection systems, these two goals may be in competition. Preferably, the algorithm generates a product reorder message only after repeatedly detecting the empty bin's RFID tag on the reorder panel 13 several times over a long detection period, such as 300 seconds. For example, the product reorder message is generated if the bin's RFID tag is detected at least 30 times during a 300 second period. However, to provide faster confirmation feedback for the user that the bin has been detected, the algorithm displays a detection confirmation message on the user interface 19 after detecting the bin's RFID tag only three times. Thus, although the user quickly sees feedback, the system does not actually send the reorder message until the full number of required detections, such as 30, have been counted.

Also, if the bin is not detected again for a certain time, such as 10 seconds, after sending the detection confirmation message to the user interface, then another message is sent to the user interface to let the user know there is now some doubt about the presence of the bin on the reorder panel. If the bin is still not detected for a longer time, such as 120 seconds, after sending the detection confirmation message to the user interface, then a third message is sent to the user interface to let the user know that the bin is not detected on the reorder panel, and that no reorder message has been sent.

Figure 5:
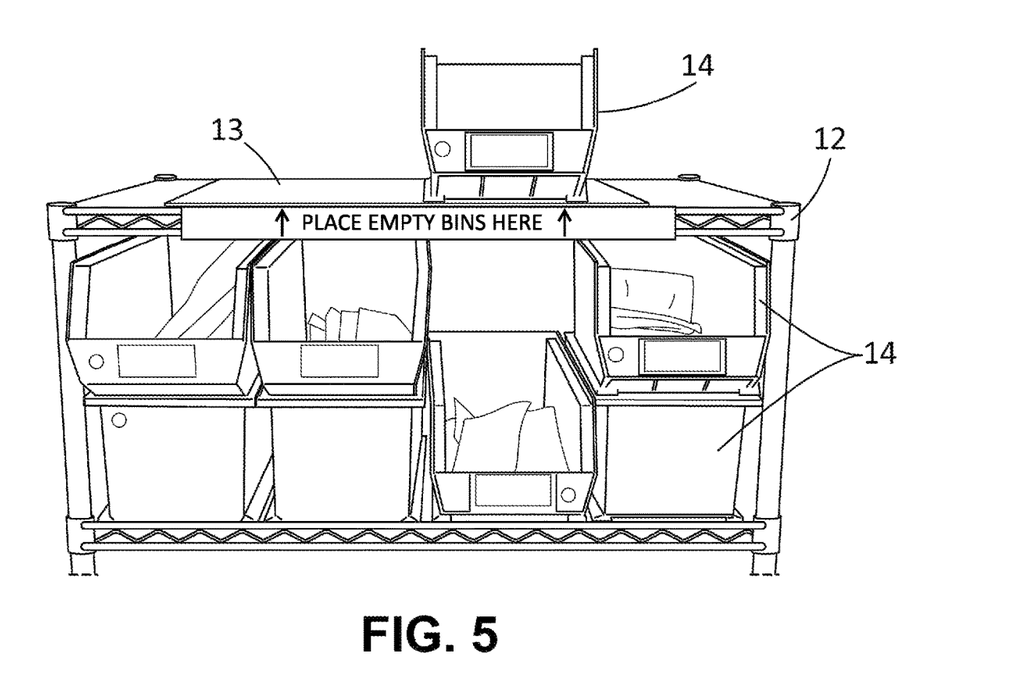
FIG. 5 depicts an alternative arrangement of bins according to a preferred embodiment.

In some embodiments, as depicted in FIG. 5, the bins 14 in the two-bin Kanban system are stacked vertically instead of front-to-back on the shelving. In these embodiments, items are removed from the top bin 14 until that bin's supply is depleted, at which point the empty bin is placed on the reorder panel 13. The bottom bin 14 is then turned around by 180 degrees so that items may be easily removed from it, and the cycle continues.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for managing an inventory of goods stored in multiple bins on a shelving system, the apparatus comprising:
   an RFID antenna disposed in or on an upper shelf of the shelving system, the RFID antenna for communicating with RFID tags disposed above the upper shelf;
   RF shielding disposed between the RFID antenna and a lower shelf of the shelving system that is disposed below the upper shelf;
   a first RFID tag attached to a bin configured to contain the goods, the first RFID tag encoded with information identifying the goods stored in the bin to which the first RFID tag is attached;
   an RFID reader in electrical communication with the RFID antenna, the RFID reader for performing scans to detect RFID tags disposed above the upper shelf; and
   an inventory computer in electrical communication with the RFID reader, the inventory computer configured to execute instructions to:
      generate a bin detection message based on the first RFID tag being detected on the upper shelf by the RFID reader at least a first number of times during a predetermined detection period, wherein the first number of times is greater than one;
      communicate the bin detection message to a user to inform the user that a bin has been detected on the upper shelf; and
      after communication of the bin detection message to the user, generate a product reorder message based on the first RFID tag being detected on the upper shelf by the RFID reader at least a second number of times during the predetermined detection period, wherein the product reorder message includes the information identifying the goods stored in the bin, and wherein the second number of times is greater than the first number of times.

2. The apparatus of claim 1 further comprising a user interface configured to display the bin detection confirmation message to the user.

3. The apparatus of claim 1 further comprising an inventory management server computer in communication with the inventory computer via a communication network, the inventory management server computer programmed to initiate a process to replenish the goods identified by the information in the product reorder message.

4. The apparatus of claim 1 wherein the first RFID tag comprises two RFID integrated circuits oriented at a right angle with respect to each other.

5. The apparatus of claim 1 further comprising a second RFID tag attached to the bin, the second RFID tag encoded with information identifying the goods stored in the bin, wherein the second RFID tag is oriented at a right angle with respect to the first RFID tag.

6. The apparatus of claim 1 wherein the first number of times is at least three times.

7. The apparatus of claim 1 wherein the second number of times is at least 30 times.

8. The apparatus of claim 1 wherein the predetermined detection period is at least 300 seconds.

9. The apparatus of claim 1 wherein the RFID antenna and the RF shielding are integrated into a panel configured to be disposed in or on the upper shelf of the shelving system.

10. The apparatus of claim 1 wherein the first RFID tag is attached to a bottom surface of the bin using an adhesive strip.

11. The apparatus of claim 1 wherein the first RFID tag is integrated into a bottom surface of the bin.

12. A method for managing an inventory of goods stored in multiple bins on a shelving system, the method comprising:
   (a) disposing an RFID antenna in or on an upper shelf of the shelving system, the RFID antenna for communicating with RFID tags disposed above the upper shelf;
   (b) disposing RF shielding between the RFID antenna and a lower shelf of the shelving system that is disposed below the upper shelf;
   (c) attaching an RFID tag to a bin configured to contain the goods, the RFID tag encoded with information identifying the goods stored in the bin to which the first RFID tag is attached;
   (d) stocking the bin with an initial quantity of the goods;
   (e) disposing the bin on the lower shelf of the shelving system;
   (f) depleting the initial quantity of the goods in the bin over time as the goods are consumed;
   (g) upon depletion of the initial quantity of the goods in the bin, placing the bin above the RFID antenna on the upper shelf;
   (h) performing scans to detect RFID tags disposed above the upper shelf using an RFID reader that is in electrical communication with the RFID antenna;
   (i) detecting the RFID tag attached to the bin that was placed above the RFID antenna;
   (j) generating a bin detection message based on the RFID tag attached to the bin being detected by the RFID reader at least a first number of times during a predetermined detection period, wherein the first number of times is greater than one, and wherein the bin detection message is generated based on instructions executed by an inventory computer that is in electrical communication with the RFID reader;
   (k) communicating the bin detection message to a user interface device that is in electrical communication with the inventory computer to inform a user that a bin has been detected on the upper shelf;
   (l) after communicating the bin detection message to the user interface, generating a product reorder message based on the RFID tag attached to the bin being detected by the RFID reader at least a second number of times during the predetermined detection period, wherein the product reorder message is generated based on instructions executed by the inventory computer, wherein the product reorder message includes the information identifying the goods stored in the bin, and wherein the second number of times is greater than the first number of times;
   (m) communicating the product reorder message to an inventory management server computer; and
   (n) the inventory management server computer initiating a process to replenish a supply of the goods identified by the information in the product reorder message.

13. A method for managing an inventory of goods stored in multiple bins on a shelving system, the method comprising:
   (a) disposing an RFID antenna in or on an upper shelf of the shelving system, the RFID antenna for communicating with RFID tags disposed above the upper shelf;
   (b) disposing RF shielding between the RFID antenna and a lower shelf of the shelving system that is disposed below the upper shelf;

(c) attaching an RFID tag to a bin configured to contain the goods, the RFID tag encoded with information identifying the goods stored in the bin to which the first RFID tag is attached;

(d) stocking the bin with an initial quantity of the goods;

(e) disposing the bin on the lower shelf of the shelving system;

(f) depleting the initial quantity of the goods in the bin over time as the goods are consumed;

(g) upon depletion of the initial quantity of the goods in the bin, placing the bin above the RFID antenna on the upper shelf;

(h) performing scans to detect RFID tags disposed above the upper shelf using an RFID reader that is in electrical communication with the RFID antenna;

(i) detecting the RFID tag attached to the bin that was placed above the RFID antenna;

(j) generating a bin detection message based on the RFID tag attached to the bin being detected at least a first number of times during a predetermined detection period, wherein the first number of times is greater than one, and wherein the bin detection message is generated based on instructions executed by an inventory computer that is in electrical communication with the RFID reader;

(k) communicating the bin detection message to a user interface device that is in electrical communication with the inventory computer to inform a user that a bin has been detected on the upper shelf;

(l) determining that the RFID tag attached to the bin has not been detected for at least a first continuous period of time after communication of the bin detection message to the user interface; and (m) based on the determination of step (l), communicating a second message to the user interface to inform the user that there is uncertainty about whether a bin is present on the upper shelf.

14. The method of claim 13 further comprising, after step (m):

(n) determining that the RFID tag attached to the bin has not been detected by the RFID reader for at least a second continuous period of time after communication of the bin detection message to the user interface, wherein the second continuous period of time is greater than the first continuous period of time; and (o) based on the determination of step (n), communicating a third message to the user interface to inform the user that a bin has not been detected on the upper shelf.

* * * * *